(12) United States Patent
Peuker et al.

(10) Patent No.: US 7,445,098 B2
(45) Date of Patent: Nov. 4, 2008

(54) DAMPER

(75) Inventors: Thomas Peuker, Ammerthal (DE); Andreas Pelczer, Wassertrüdingen (DE); Michael Weder, Nürnberg (DE)

(73) Assignee: Suspa Holding GmbH, Altdorf (DE)

( * ) Notice: Subject to any disclaimer, the term of this patent is extended or adjusted under 35 U.S.C. 154(b) by 6 days.

(21) Appl. No.: 11/226,446

(22) Filed: Sep. 15, 2005

(65) Prior Publication Data

US 2006/0054440 A1  Mar. 16, 2006

(30) Foreign Application Priority Data

Sep. 15, 2004  (DE)  ............. 10 2004 045 066

(51) Int. Cl.
*F16F 9/00* (2006.01)
*B60G 13/00* (2006.01)

(52) U.S. Cl. .................. 188/381; 267/196; 267/201

(58) Field of Classification Search ............ 188/381; 267/196, 201
See application file for complete search history.

(56) References Cited

U.S. PATENT DOCUMENTS

| | | | | |
|---|---|---|---|---|
| 3,866,724 A | * | 2/1975 | Hollnagel | 188/129 |
| 4,606,442 A | * | 8/1986 | Paton et al. | 188/381 |
| 4,738,437 A | * | 4/1988 | Paton et al. | 267/196 |
| 4,934,493 A | * | 6/1990 | Bauer et al. | 188/381 |
| 5,549,182 A | * | 8/1996 | Ehrnsberger et al. | 188/129 |
| 5,961,105 A | * | 10/1999 | Ehrnsberger et al. | 267/216 |
| 6,264,014 B1 | * | 7/2001 | Ferlicca | 188/129 |
| 6,367,601 B1 | * | 4/2002 | Ferlicca | 188/381 |
| 6,955,248 B2 | * | 10/2005 | Park et al. | 188/267 |
| 2006/0054440 A1 | * | 3/2006 | Peuker et al. | 188/381 |

FOREIGN PATENT DOCUMENTS

| | | |
|---|---|---|
| DE | 2406144 | 2/1974 |
| DE | 3725100 A1 | 7/1987 |
| DE | 4419870 A1 | 6/1994 |
| DE | 196 15 010 A1 | 10/1997 |
| DE | 10046712 A1 | 9/2000 |
| DE | 10046712 A1 * | 4/2001 |
| EP | 0 407 755 A1 | 1/1991 |
| EP | 0 478 983 A2 | 4/1992 |
| EP | 0 702 165 A2 | 3/1996 |
| GB | 2279968 A | 1/1995 |
| WO | WO 93/13333 A2 | 7/1993 |
| WO | WO 95/14130 | 5/1995 |

* cited by examiner

*Primary Examiner*—Robert A. Siconolfi
*Assistant Examiner*—Mahbubur Rashid
(74) *Attorney, Agent, or Firm*—Browdy and Neimark, P.L.L.C.

(57) ABSTRACT

In a damper for spin-drying washing machines, it is provided, with a view to amplitude-dependent damping behaviour being obtained accompanied with manufacture at a low cost, that a frictional damping unit, which is disposed inside a casing, comprises an at least sectionally bare and elastic frictional damping lining for producing a given frictional damping effect, and at least one stop element which is stationary in relation to the casing and turned towards the at least one frictional damping lining, with the at least one stop element being designed for direct cooperation with the at least one frictional damping lining.

8 Claims, 9 Drawing Sheets

DAMPER

BACKGROUND OF THE INVENTION

1. Field of the Invention

The invention relates to a damper for spin-drying washing machines.

2. Background Art

Dampers of the generic type are used for vibration damping in cylinder washing machines, ensuring smooth and vibrationless operation of the cylinder washing machine. Known dampers, at varying speeds of the washing cylinder, exhibit a damping behaviour that depends on the vibration amplitude. A reduced damping effect of the dampers is desirable in the range of small amplitudes, whereas great amplitudes require as strong as possible a damping effect. This amplitude-dependent damping behaviour leads to a constructionally complicated design of the dampers.

SUMMARY OF THE INVENTION

It is an object of the invention to improve a damper of amplitude-dependent damping behaviour in such a way that it is easy to manufacture at a low cost.

This object is attained by a damper for spin-drying washing machines comprising a tubular casing which has a central longitudinal axis; a tappet which is guided for displacement in the casing and projects from an end thereof; fastening elements which are mounted on a free end of the casing and of the tappet, respectively; and a frictional damping unit, which is disposed inside the casing, comprising at least one elastic frictional damping lining which is displaceable in relation to the casing and the tappet along the central longitudinal axis and which lies bare at least sectionally in a lengthwise axial direction, producing a given frictional damping effect, and at least one stop element which is stationary in relation to the casing and turned towards the at least one frictional damping lining, defining the motion of the at least one frictional damping lining, with the at least one stop element being configured such that, for motion damping, it directly cooperates with the at least one frictional damping lining. The gist of the invention resides in that the elastic frictional damping lining lies open at least sectionally in the axial direction so that the stop element, in the case of great vibration amplitudes, cooperates directly with the frictional damping lining. Thus, the frictional damping lining simultaneously fulfills the task of a stop buffer, this leading to constructional simplicity of design and to manufacture of the damper at a low cost.

Further features, details and advantages of the invention will become apparent from the ensuing description of several exemplary embodiments, taken in conjunction with the drawing.

DESCRIPTION OF PREFERRED EMBODIMENTS

A first embodiment of the invention is going to be described below, taken in conjunction with FIGS. 1 to 7. A cylinder washing machine seen in FIGS. 1 and 2 with a horizontal or inclined cylinder axis 1 comprises a vibratory washing aggregate 2 with a drive motor 3 which, via a belt drive 4, actuates a washing cylinder, details of which are not shown. To simplify matters, further components that are connected to the washing aggregate 2, for instance a transmission, are not shown. By means of helical extension springs 5, the vibratory washing aggregate 2 is suspended from a washing-machine casing 6 which is supported on, and connected to, a machine frame 8 that stands on the ground 7 and constitutes a base frame. On the one hand, the helical extension springs 5 are fixed to eyelets 9 which are disposed in the top area of the washing aggregate 2. On the other hand, they are suspended from eyelets 10 which are formed on the washing-machine casing 6. The casing 6 is covered by a cover plate 11.

Figure 1:
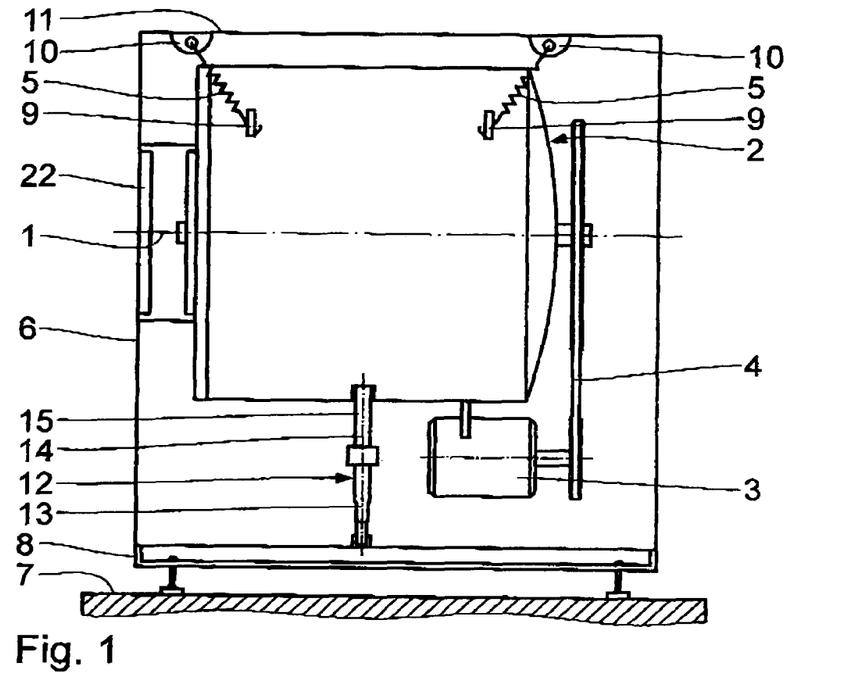
FIG. 1 is a diagrammatic side view of a cylinder washing machine with a damper according to a first embodiment.
Figure 2:
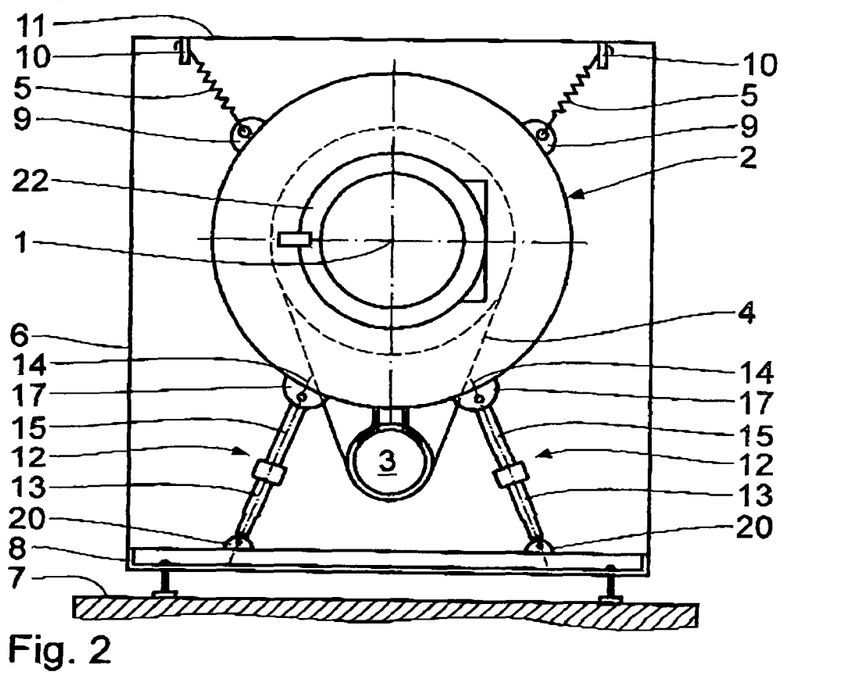
FIG. 2 is an elevation of the cylinder washing machine according to FIG. 1.

Two frictional dampers 12, details of which will be described below, are mounted centrically on the bottom side of the washing aggregate 2; they are connected to the machine frame 8. Each frictional damper 12 comprises a tubular casing 13 with a central longitudinal axis 14, with a tappet 15 being coaxially displaceable therein. At its free end, the tappet 15 comprises a first fastening element 16, by means of which the frictional damper 12 is fixed to a bearing 17 on the washing aggregate 2 for the frictional damper 12 to be able to pivot in relation to the washing aggregate 2 about a pivoting axis 18 that is parallel to the cylinder axis 1. Mounted on the free end of the casing 13 is a second fastening element 19, by means of which the frictional damper 12 is fixed to a bearing 20 on the machine frame 8 in such a way that the frictional damper 12 is able to pivot in relation to the machine frame 8 about a pivoting axis 21 that is parallel to the cylinder axis 1. A flap 22 which is disposed on the washing aggregate 2 serves for laundry to be put in and taken out.

The design of the frictional damper 12 will be described in detail in the following, taken in conjunction with FIGS. 3 to 7. The tubular casing 13 of the frictional damper 12 comprises a guiding section 23 and a take-up section 24 which forms one piece therewith. The guiding section 23 is disposed downstream of the take-up section 24 in a direction of insertion 25. The free end of the guiding section 23, which is simultaneously the free end of the casing 13, is closed by means of a bottom 26. The bottom 26 and the fastening element 19 are one piece. The guiding section 23 has an inside diameter selected for the tappet 15 to have as little play as possible in the direction of insertion 25 and to be displaceable without static friction.

Figure 3:
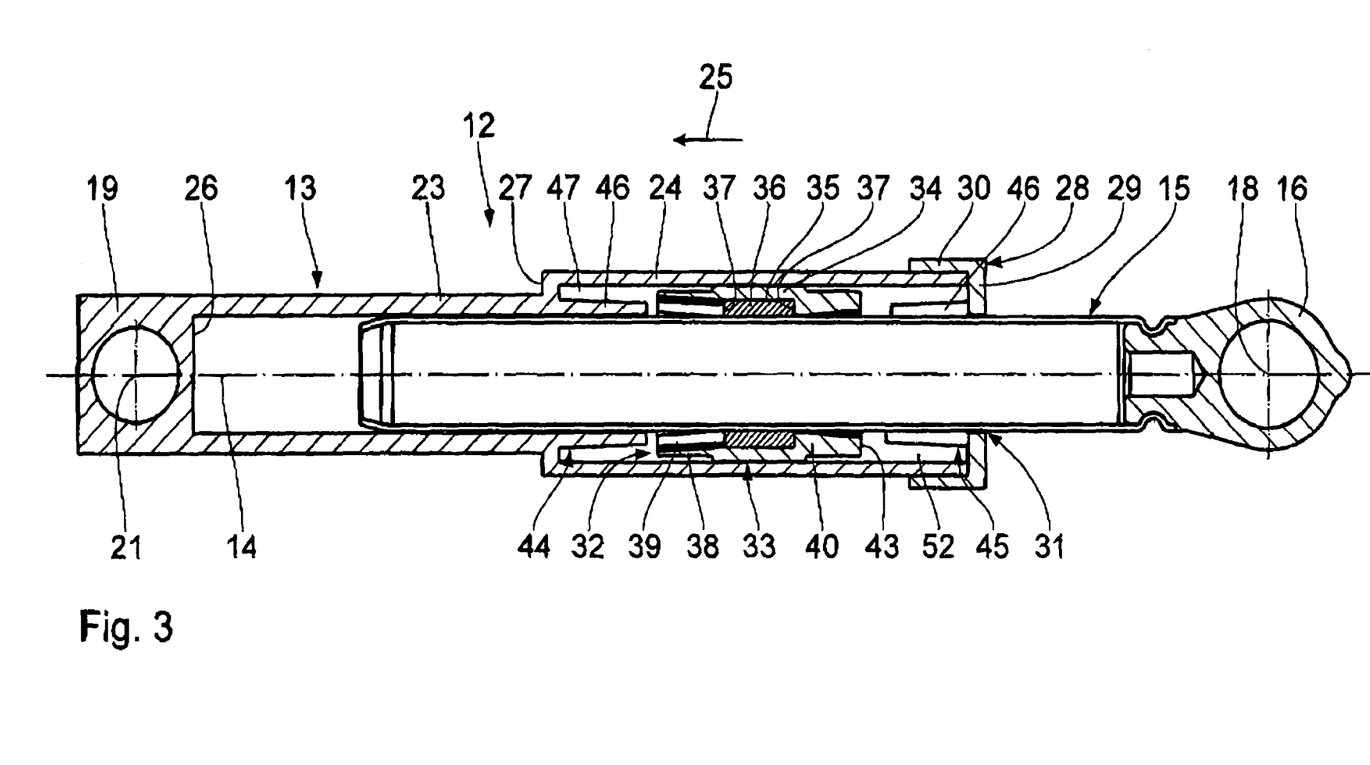
FIG. 3 is an axial sectional view of the damper of FIG. 1.

The take-up section 24 is disposed upstream of the guiding section 23 in the direction of insertion 25. The take-up section 24 has an inside diameter which is greater than that of the guiding section 23. The take-up section 24 is fixed to the end, on the side of the tappet, of the guiding section 23 by means of an annular stop collar 27.

At its end turned away from the guiding section 23, the take-up section 24 is closed by means of a cap 28. The cap 28 possesses an annular collar 29 and a tubular fastening section 30 fixed thereto, the fastening section 30 extending in the direction of the central longitudinal axis 14 and encompassing the take up section 24. The end, turned away from the guiding section 23, of the take-up section 24 bears against the cap collar 29, and the cap 28 is safeguarded against displacement in the vicinity of the fastening section 30 by means of a locking mechanism (not shown). The annular cap collar 29 forms a cap aperture 31 where the tappet 15 is guided with as little play as possible.

Figure 4:
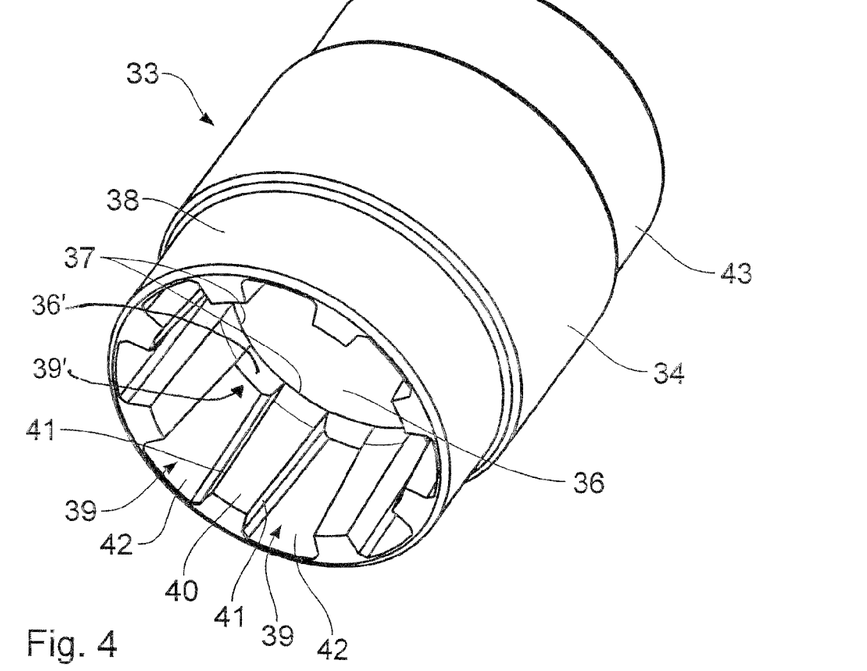
FIG. 4 is a perspective view of a contact-pressure piston of the damper of FIG. 1.

Within the casing 13, a frictional damping unit 32 is provided in the vicinity of the take-up section 24. The frictional damping unit 32 comprises a contact-pressure piston 33 which is displaceable along the central longitudinal axis 14. The contact-pressure piston 33 is substantially tubular, comprising a centric contact-pressure section 34 where an encircling annular groove 35 is provided which is turned towards the tappet 15. The annular groove 35 holds an annularly encircling, elastic frictional damping lining 36 which bears against side walls 37 of the annular groove 35 so that it is safeguarded against displacement in relation to the contact-pressure piston 33, when rubbing against the tappet 15. The side walls 37 of the annular groove 35 are embodied in such a way that the contact-pressure piston 33 is guided along the central longitudinal axis 14 on the tappet 15.

A first stop section 38 which forms one piece with the contact-pressure section 34 proceeds from the side wall 37 that is turned towards the casing 13. The first stop section 38 is tubular and does not bear against the take-up section 24 of the casing 13 as it is spaced apart from section 24. The stop section 38, on its inside circumference, comprises several longitudinal grooves 39 which are regularly spaced and extend along the central longitudinal axis 14 and which taper in the direction of the frictional damping lining 36; the grooves 39 extend as far as to the frictional damping lining 36. Thus the frictional damping lining 36 is bare in the vicinity of the grooves 39 in the axial direction as FIG. 4 shows the opposite ends 36' of the lining facing open ends 39' of grooves 39 are uncovered. Two grooves 39 at a time face each other diametrically. A wedge 40 is located between two side by side grooves 39, tapering in a direction opposite to the grooves 39 and extending in the form of a ramp in the direction of the side wall 37 with which it forms one piece. Each wedge 40 has side walls 41, each of which define a bottom 42 of an adjacent groove 39. Each bottom 42 also extends in the form of a ramp in the direction of the frictional damping lining 36.

A second stop section 43, corresponding to the first stop section 38, proceeds from the side wall 37 that is turned towards the tappet 15. The second stop section 43 corresponds in design to the first stop section 38 and forms one piece with the contact-pressure section 34. The grooves 39 and 10 wedges 40 of the second stop section 43 are displaced in relation to the first stop section 38. This means that a wedge 40 of the first stop section 38 is located opposite a groove 39 of the second stop section 43 and vice versa. For simplicity of mounting of the frictional damping lining 36, the contact-pressure piston 33 may also be embodied in several pieces.

For the motion of the contact-pressure piston 33 with the frictional damping lining 36 to be defined and for damping operation to be obtained, the frictional damping unit 32 comprises a first stop element 44 on the side of the casing 13 and a second stop element 45 on the side of the tappet 15. The first stop element 44 comprises several stop pins 46 which, proceeding from the stop collar 27 of the casing 13, extend along the central longitudinal axis 14. The stop pins 46 of the first stop element 44 form one piece with the stop collar 27 and the guiding section 23 of the casing 13. A two-piece design, possibly of various materials, is just as well conceivable. The stop pins 46 are disposed and embodied for prolonging the guiding section 23 so that the tappet 15 is additionally guided by the stop pins 46 of the first stop element 44. The stop pins 46 are further embodied and disposed for the contact-pressure piston 33, by the grooves 39 of the first stop section 38, to be able to encompass the stop pins 46 so that the contact-pressure piston 33 is movable into a first annular space 47 between the take-up section 24 and the stop pins 46. A detailed description of the stop pins 46 and the arrangement thereof will follow, taken in conjunction with the description of the second stop element 45.

Figure 5:
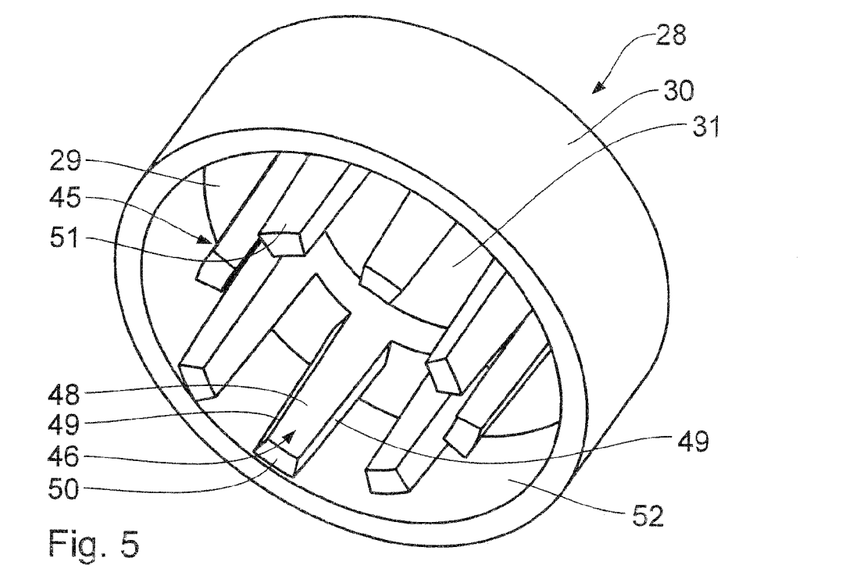
FIG. 5 is a perspective view of a cap of the damper of FIG. 1.
Figure 6:
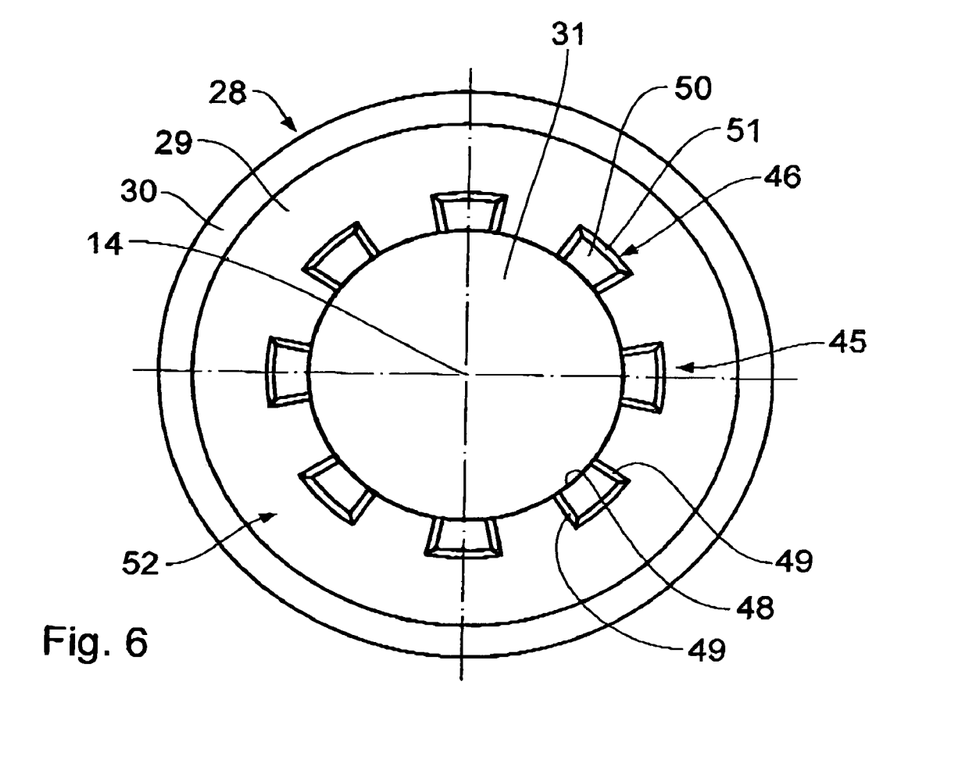
FIG. 6 is an elevation of the cap of FIG. 5.
Figure 7:
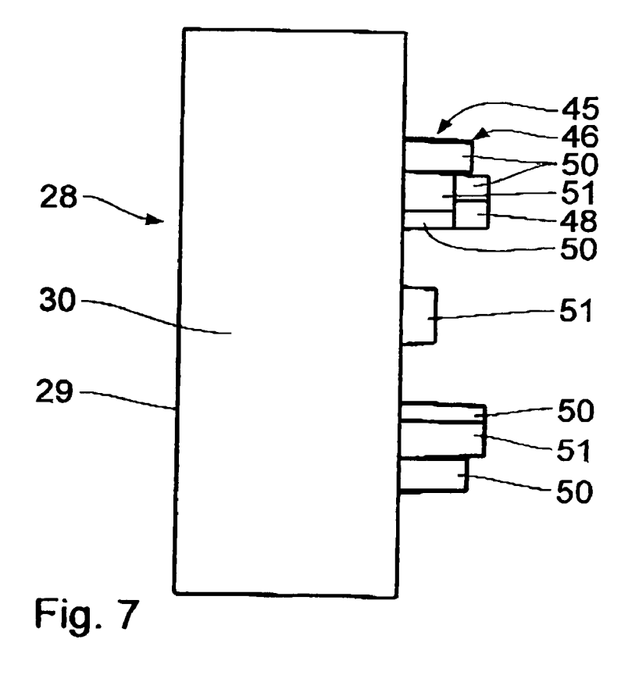
FIG. 7 is a side view of the cap of FIG. 5.

The second stop element 45 also comprises several stop pins 46 which form one piece with the collar 29 of the cap 28 and extend along the central longitudinal axis 14. A two-piece design, possibly of various materials, is also conceivable. The stop pins 46 are disposed in a circle around the central longitudinal axis 14, forming a flush prolongation of the cap aperture 31 so that the tappet 15 is additionally guided by the stop pins 46. To this end, the stop pins 46 are embodied as ring segments, with a guide wall 48 that is turned towards the tappet 15 being arched, corresponding to the periphery of the tappet 15. Proceeding from the cap collar 29, each stop pin 46 tapers towards the frictional damping lining 36, having two side walls 49 and a front wall 50. On its side turned away from the tappet 15, each stop pin 46 additionally comprises an outside wall 51 which extends in the form of a ramp in the direction of the cap collar 29. Two stop pins 46 at a time oppose each other diametrically, these two stop pins 46 being of uniform length along the central longitudinal axis 14, but deviating in length as compared to the remaining stop pins 46. A different arrangement is possible too. The stop pins 46 of the second stop element 45 combine with the take-up section 24 of the casing 13 to form a second annular space 52 into which to move the second stop section 43 of the contact-pressure piston 33.

The detailed design of the first stop element 44 corresponds to that of the second stop element 45, with the stop pins 46 of the second stop element 45 being displaced as compared to those of the first stop element 44 so that they may engage with the displaced grooves 39 of the second stop section 43.

Fundamentally, any design of the stop pins 46, in particular of the length and shape thereof, is possible as long as the stop pins 46 correspond in length and shape to the corresponding grooves 39 so that the stop pins 46 are able to cooperate with the frictional damping lining 36. Pins of varying lengths are preferred, ensuring continuous, progressive damping.

Within the casing 13, the tappet 15 is guided for displacement along the central longitudinal axis 14 by means of the guiding section 23 and the aperture 31 of the cap collar 29. The tappet 15 is tubular and has a tapering end.

In the following, the mode of operation of the frictional damper 12, upon operation of the cylinder washing machine, will be described in detail. At first, a load of laundry is being put into the washing aggregate 2 and the washing cylinder is being set rotating by means of the drive motor 3 and the belt drive 4. The damping behaviour of the frictional damper 12 in the case of small vibration amplitudes is going to be described first. These small vibration amplitudes occur in the case of so-called uncritical speeds, for example with the cylinder washing machine spinning. In this case, the motion of the tappet 15 in relation to the casing 13 along the central longitudinal axis 14 is so insignificant that the contact-pressure piston 33, together with the frictional damping lining 36, does not touch the first and second stop element 44, 45. Owing to the static friction of the frictional damping lining 36, there is no motion of the contact-pressure piston 33 in relation to the tappet 15 so that the frictional damping lining 36 does not rub against the tappet 15. This status is termed friction-less idle stroke. In this condition, the frictional damper 12 exhibits insignificant damping behaviour which is characterized by the other friction losses upon the motion of the tappet 15. In this condition, the casing 13 and the tappet 15 are un-coupled as far as possible.

If however the speed of the cylinder washing machine is in the range of a so-called critical speed or should there be significant imbalance, then there are important vibration amplitudes of the tappet 15 in relation to the casing 13. This is when the contact-pressure piston 33, together with the frictional damping lining 36, and the stop elements 44, 45 start interacting and the contact-pressure piston 33 moves in relation to the tappet 15 so that the frictional damping lining 36 rubs against the tappet 15. If, proceeding from the position seen in FIG. 3, the tappet 15 moves in the direction of insertion 25, then the contact-pressure piston 33 starts being entrained in the direction of insertion 25 because of the static friction between the frictional damping lining 36 and the tappet 15. As the depth of insertion grows, the first stop section 38 is being guided by its grooves 39 encompassing the stop pins 46 of the first stop element 44. When the stop pins 46, by their front wall 50, touch the frictional damping lining 36 which is bare in the vicinity of the grooves 39, then the motion of the contact-pressure piston 33 is being braked, with motion of the frictional damping lining 36 relative to the tappet 15 occurring. The frictional damping lining 36 rubs against the tappet 15, producing damping behaviour. The damping behaviour is dependent on the speed of the relative motion and independent of the depth of penetration of the stop pins 46 into the frictional damping lining 36. In the frictional damper 12, the elastic frictional damping lining 36 has the additional task of a stop buffer. Owing to their varying lengths, the stop pins 46 penetrate successively into the frictional damping lining 36, there being no abrupt impact of the contact-pressure piston 33 and, consequently, no abrupt increase of load on the machine frame 8. With two opposite stop pins 46 at a time having an identical length, the contact-pressure piston 33 is safely precluded from getting tilted on the tappet 15.

Upon return of motion of the tappet 15, the contact-pressure piston 33 is at first being entrained counter to the direction of insertion 25 because of the static friction between the frictional damping lining 36 and the tappet 15, the contact-pressure piston 33 not moving in relation to the tappet 15. As the motion counter to the direction of insertion 25 continues, the second stop section 43 is being moved with the grooves 39 encompassing the stop pins 46 of the second stop element 45. By the stop pins 46 penetrating into the frictional damping lining 36, the motion of the contact-pressure piston 33 is being braked so that the frictional damping lining 36 makes a motion relative to the tappet 15 and rubs against the tappet 15. The cooperation of the second stop element 45 with the frictional damping lining 36 corresponds to the above-mentioned penetration behaviour of the first stop element 44. The cap collar 29 serves as a final stop of the contact-pressure piston 33. Upon renewed return of motion of the tappet 15, the contact-pressure piston 33 is again being entrained in the direction of insertion 25 because of the static friction between the frictional damping lining 36 and the tappet 15. The described motion cycle recurs.

With the frictional damping lining 36 additionally working as a stop buffer, the frictional damper 12 is of simple design and can be manufactured at a low cost. Moreover, the idle stroke without friction can be adjusted arbitrarily by simple constructional modifications.

Figure 8:
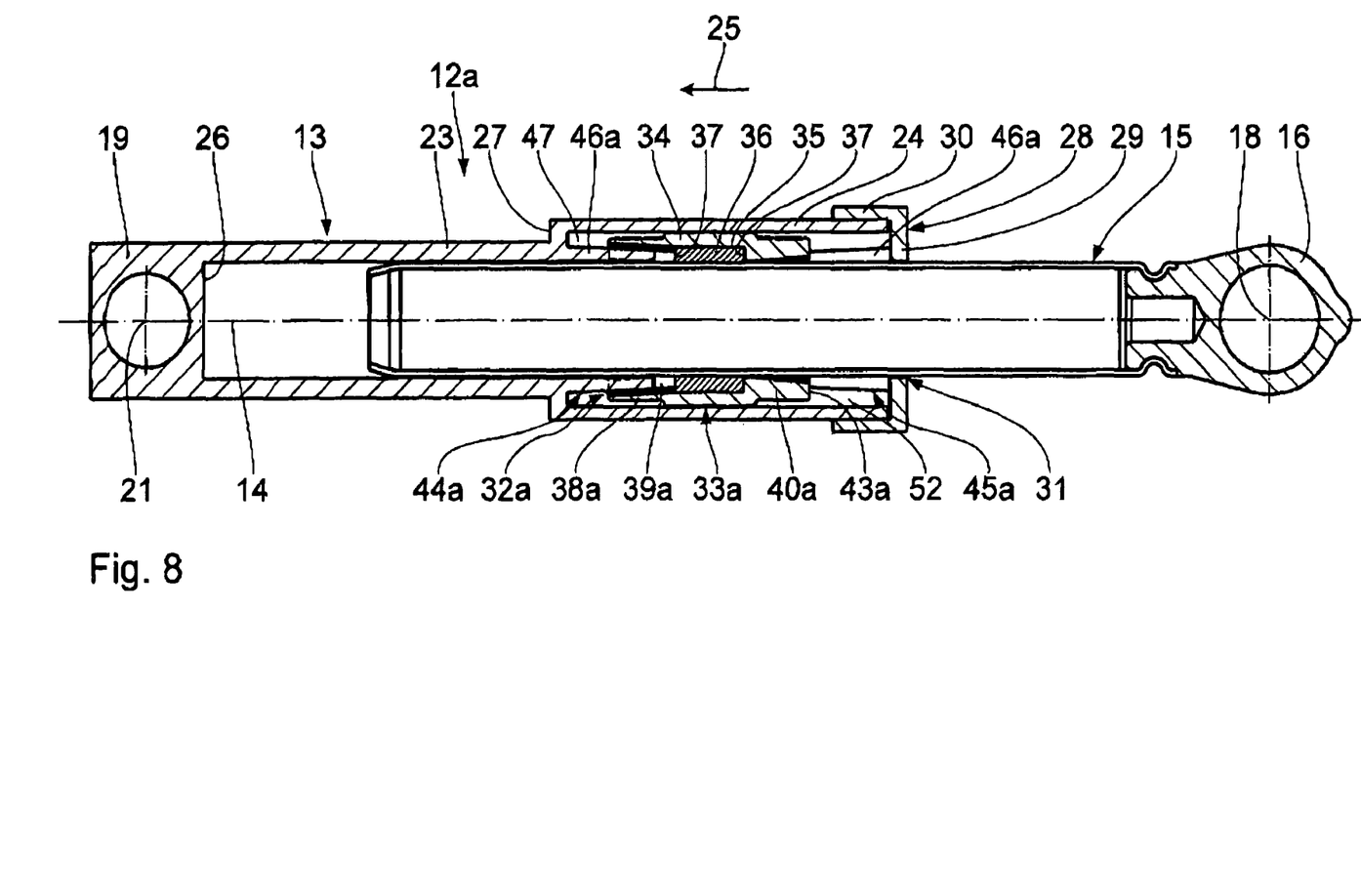
FIG. 8 is an axial sectional view of a damper according to a second embodiment.

A second embodiment of the invention will be described below, taken in conjunction with FIG. 8. Constructionally identical parts have the same reference numerals as in the first embodiment, to the description of which reference is made. Parts that differ constructionally, but are identical functionally, have the same reference numerals with an "a" suffixed. The essential difference from the first embodiment resides in that the contact-pressure piston 33a and the stop elements 44a, 45a are designed in such a way that at least one of the stop pins 46a is disposed at least sectionally in one of the grooves 39a. Such a design of the contact-pressure piston 33a and the stop elements 44a, 45a ensures that either at least one stop pin 46a of the first stop element 44a or at least one stop pin 46a of the second stop element 45a will be in engagement with one of the grooves 39a of the contact-pressure piston 33a, this providing for a safeguard against rotation of the contact-pressure piston 33a in relation to the stop elements 44a, 45a. Preferably the stop elements 44a, 45a have four stop pins 46a each. Such a number of stop pins 46a helps optimize the constructional implementation while ensuring invariable functionality of the frictional damper 12a. As regards the further mode of operation, reference is made to the first embodiment.

Figure 9:
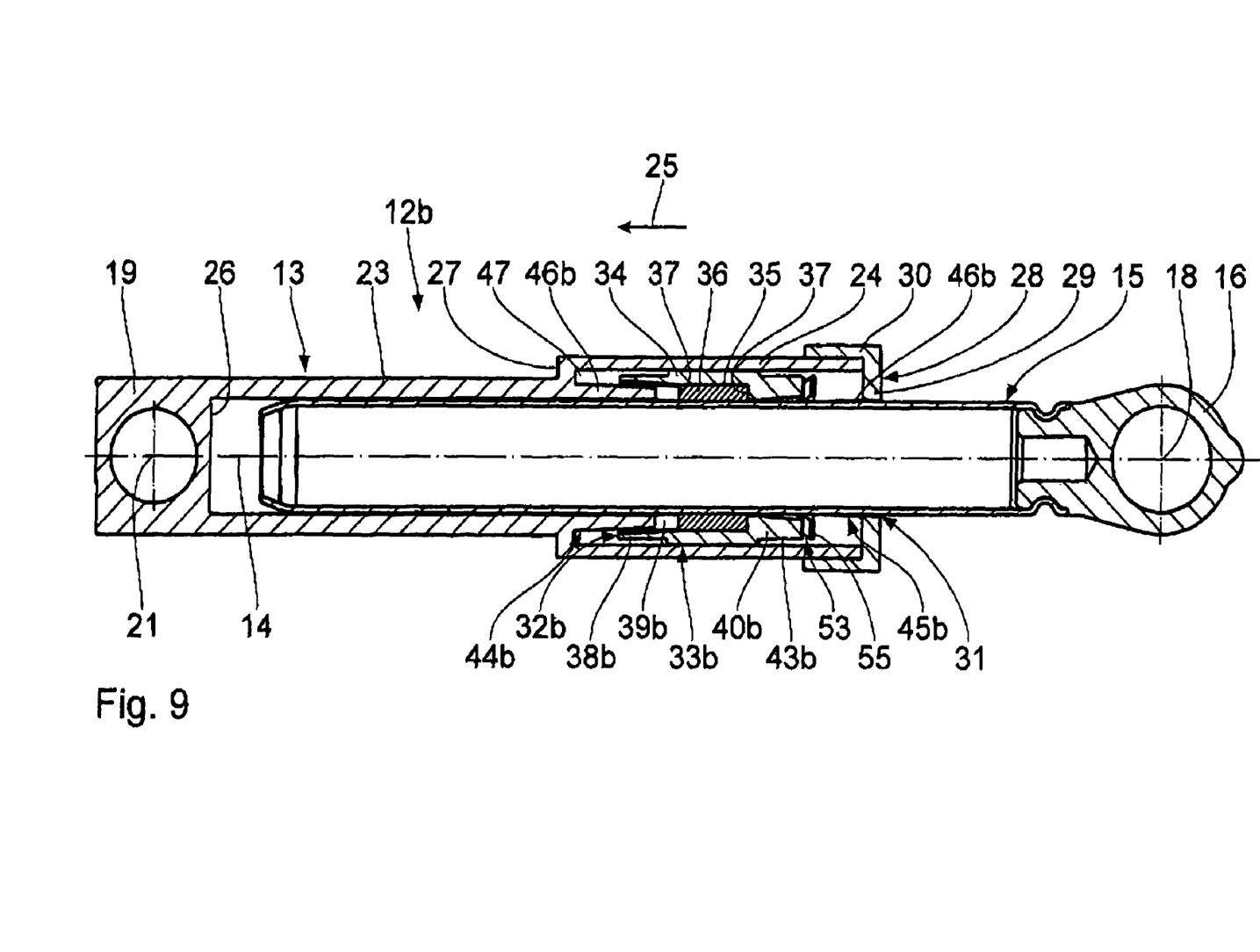
FIG. 9 is an axial sectional view of a damper according to a third embodiment.
Figure 10:
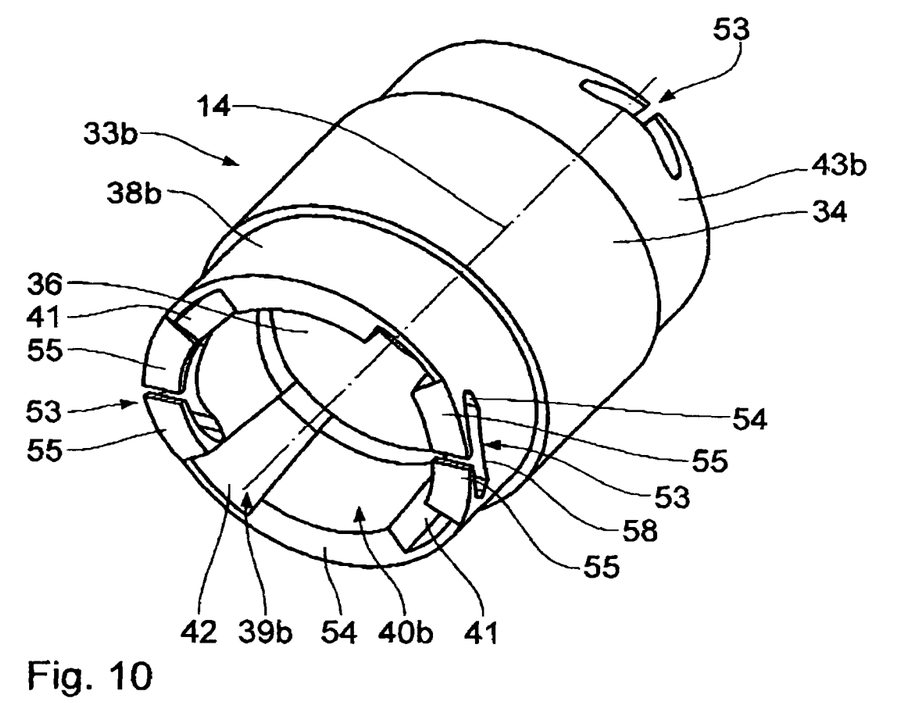
FIG. 10 is a perspective view of a contact-pressure piston of the damper of FIG. 9.
Figure 11:
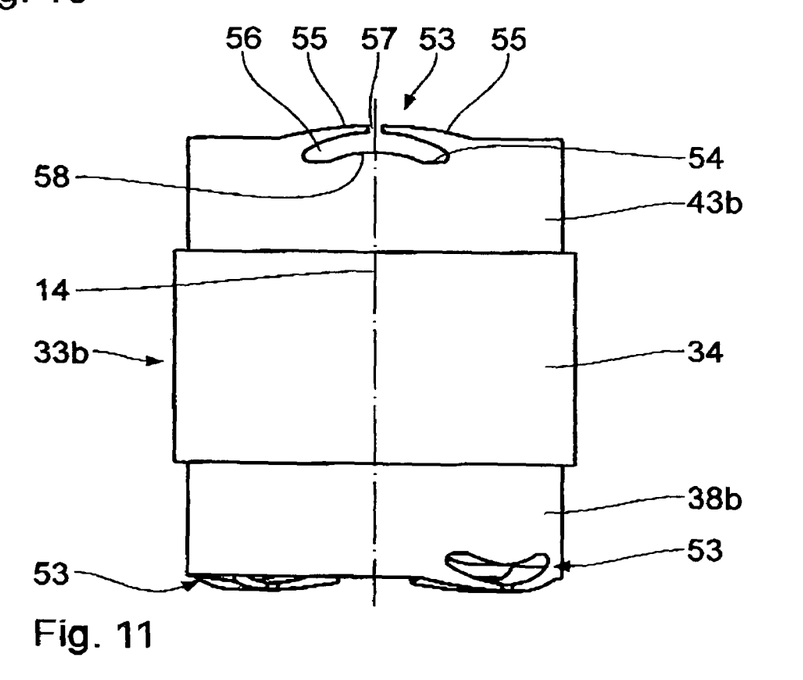
FIG. 11 is a plan view of the contact-pressure piston of FIG. 10.

A third embodiment of the invention will be described below, taken in conjunction with FIGS. 9 to 11. Constructionally identical parts have the same reference numerals as in the first embodiment, to the description of which reference is made. Parts that differ constructionally, but are identical functionally, have the same reference numerals with a "b" suffixed. The essential difference from the preceding embodiments resides in that stop buffers 53 are provided, preventing the contact-pressure piston 33b from hitting hard against the stop collar 27 or the cap collar 29 in the case of extreme vibration amplitudes. The stop sections 38b, 43b of the contact-pressure piston 33b each have four grooves 39b and wedges 40b which are disposed between the grooves 39b. Each stop section 38b, 43b further comprises two stop buffers 53 which are formed on the front walls 54 of two wedges 40b that face each other. The stop buffers 53 of the first stop section 38b are displaced in relation to the stop buffers 53 of the second stop section 43b about the central longitudinal axis 14.

The stop buffers 53 are identical, only one stop buffer 53 being described in the following. The stop buffer 53 comprises two flexible stop-buffer elements 55 which are formed in one piece with the wedge 40b, having the shape of bent tongues that proceed from the wedge side walls 41 towards each other. The stop-buffer elements 55 in the form of tongues project over the front walls 54 of the adjoining wedges 40b along the central longitudinal axis 14 and, as seen along the central longitudinal axis 14, they taper proceeding from the side walls 41. The stop-buffer elements 55 and the associated wedge front wall 54 substantially define a stop-buffer recess 56 which extends sectionally into the contact-pressure piston 33b so that the wedge front wall 54 that is allocated to the stop-buffer elements 55 stands back from the front walls 54 of the adjacent wedges 40b. The stop-buffer elements 55 are flexibly extensible into the stop-buffer recess 56. A stop-buffer opening 57 is formed between the stop-buffer elements 55 that run towards each other so that the stop-buffer elements 55 are spaced apart centrically and do not touch each other. A convex stop-buffer limit 58, which is integral with the wedge front wall 54, is disposed opposite the stop-buffer opening 57 as related to the stop-buffer recess 56. For defined flexion of the stop-buffer elements 55, the stop-buffer limit 58 proceeds from the wedge front wall 54 along the central longitudinal axis 14 into the stop-buffer recess 56. By alternative, the stop-buffer limit 58 can be dropped, the flexion of the stop-buffer elements 55 being defined by the associated wedge front wall 54.

The following is a description of the mode of operation of the frictional damper 12b in the case of extreme vibration amplitudes. Upon motion of the tappet 15 in the direction of insertion 25, the stop pins 46b of the first stop element 44b penetrate into the frictional damping lining 36 so that the contact-pressure piston 33b, entrained by the tappet 15, makes a motion relative to the tappet 15 and rubs against the tappet 15. As a result of the stop pins 46b penetrating, the elastic frictional damping lining 36 counteracts the motion of the contact-pressure piston 33b, buffering the impact of the stop pins 46b on the frictional damping lining 36. If the vibration amplitude of the frictional damper 12b is such that the buffering action of the frictional damping lining 36 does not sufficiently define the motion of the contact-pressure piston 33b, then the stop buffers 53 start working. In the case of extreme vibration amplitudes, the stop-buffer elements 55 of the stop buffers 53 hit against the stop collar 27 of the guiding section 23. As the motion of the contact-pressure piston 33b continues in the direction of insertion 25, the flexible stop-buffer elements 55 bend in a direction towards the stop-buffer limit 58, buffering the motion of the contact-pressure piston 33b. When the motion of the contact-pressure piston 33b stops, then the flexible stop-buffer elements 55 rebound, moving the contact-pressure piston 33b back against the direction of insertion 25 until they relax. In the case of extreme vibration amplitudes, the flexion of the stop-buffer elements 55 is defined by them hitting on the stop-buffer limit 58 or, should there be not stop-buffer limit 58, by them hitting on the associated wedge front wall 54. Simultaneously, the front walls 54 of the wedges 40b that adjoin the stop buffers 53 hit on the stop collar 27. Upon return motion of the tappet 15, the contact-pressure piston 33b is entrained counter to the direction of insertion 25, the described process repeating when the contact-pressure piston 33b hits on the cap collar 29. Alternatively, the stop buffers 53 may also be formed on the stop collar 27 and the cap collar 29. As for the further mode of operation, reference is made to the preceding embodiments.

Figure 12:
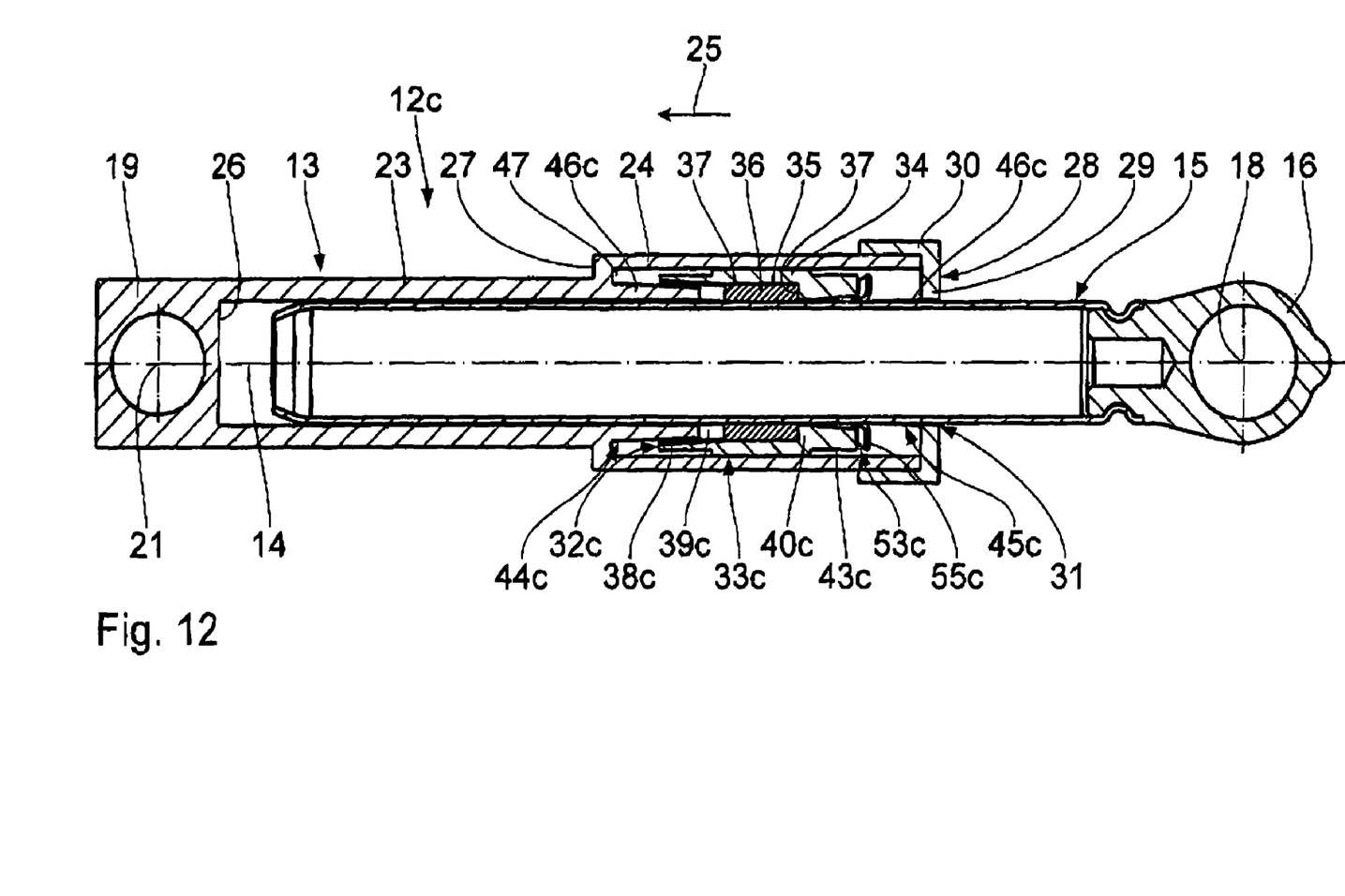
FIG. 12 is an axial sectional view of a damper according to a fourth embodiment.
Figure 13:
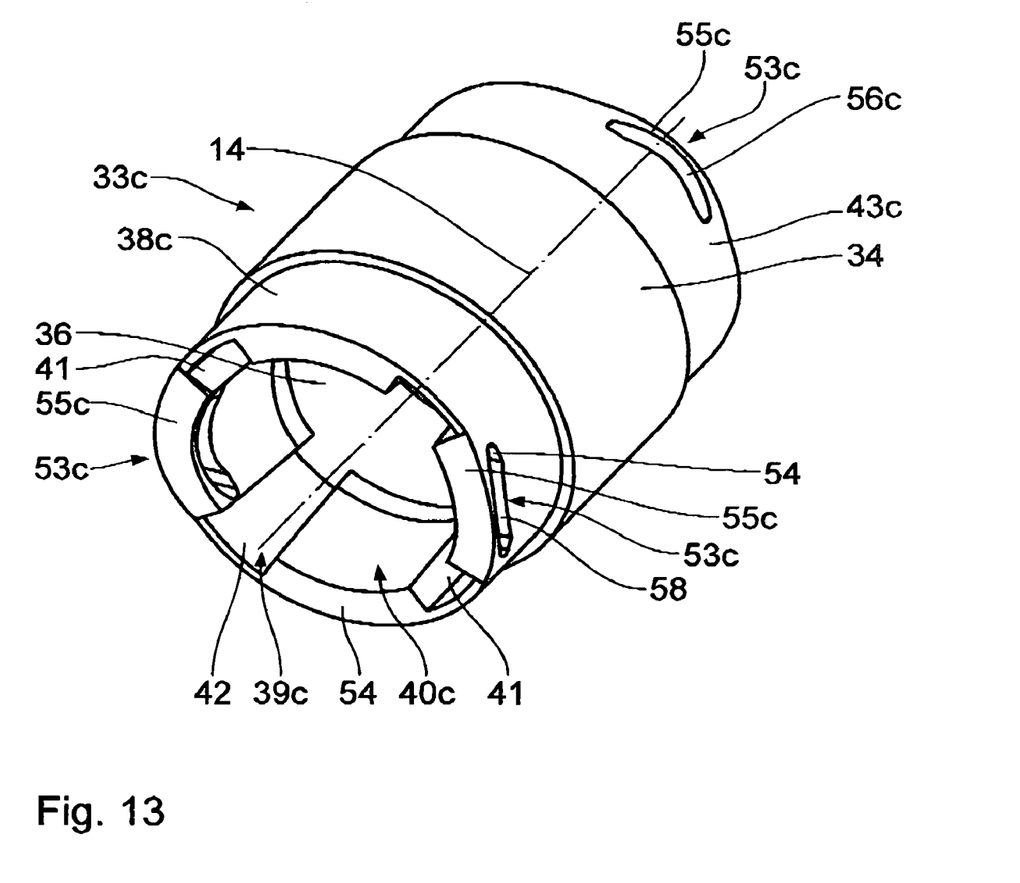
FIG. 13 is a perspective view of a contact-pressure piston of the damper according to FIG. 12.

A fourth embodiment of the invention will be described below, taken in conjunction with FIGS. 12 and 13. Constructionally identical parts have the same reference numerals as in the preceding embodiments, to the description of which reference is made. Parts that differ constructionally, but are identical functionally, have the same reference numerals with a "c" suffixed. The essential difference from the preceding embodiments resides in that the stop buffers 53c each have a continuous, convex stop-buffer element 55c which narrows centrically, entirely defining the stop-buffer recess 56 on the side opposite the wedge front wall 54. A stop-buffer opening is not provided. Alternatively, the stop buffers 53c may also be disposed on the stop collar 27 and the cap collar 29. As regards the mode of operation of the frictional damper 12c, reference is made to the preceding embodiments.

What is claimed is:

1. A damper (12; 12a; 12b; 12c) for spin-drying washing machines comprising
   a tubular casing (13) which has a central longitudinal axis (14);
   a tappet (15) which is guided for displacement in the casing (13) and projects from an end thereof;
   fastening elements (16, 19) which are mounted on a free end of the casing (13) and of the tappet (15), respectively; and
   a frictional damping unit (32; 32a; 32b; 32c) which is disposed inside the casing (13), comprising
      at least one annular elastic frictional damping lining (36) which is displaceable in relation to the casing (13) and the tappet (15) along the central longitudinal axis (14);
      at least one stop element (44, 45; 44a, 45a; 44b, 45b; 44c, 45c) which is stationary in relation to the casing (13) and faces toward the at least one frictional damping lining (36);
   wherein the at least one stop element (44, 45; 44a, 45a; 44b, 45b; 44c, 45c) comprises several stop pins (46; 46a; 46b; 46c) which extend along the central longitudinal axis (14);
   wherein the frictional damping unit (32; 32a; 32b; 32c) has a contact-pressure piston (33; 33a; 33b; 33c) which accommodates the at least one frictional damping lining (36) and has several grooves (39; 39a; 39b; 39c) which are parallel to the central longitudinal axis (14);
   wherein at least one end of the frictional damping lining which is partially uncovered within the contact-pressure piston faces open ends of the grooves; and
   wherein during motion damping of the at least one frictional damping lining the grooves move over the stop pins to cooperate with the partially uncovered end of the at least one frictional damping lining.

2. A damper according to claim 1, wherein the stop pins (46; 46a; 46b; 46c) are regularly spaced along a circle around the central longitudinal axis (14).

3. A damper according to claim 1, wherein the stop pins (46, 46a; 46b; 46c) at least partially have varying lengths.

4. A damper according to claim 1, wherein two stop pins (46; 46a; 46b; 46c) at a time oppose one another diametrically.

5. A damper according to claim 1, wherein the two opposite stop pins (46; 46a; 46b; 46c) have an identical length.

6. A damper according to claim 1, wherein the stop pins (46; 46a; 46b; 46c) taper in a direction of the at least one frictional damping lining (36).

7. A damper according to claim 1, wherein a first stop element (44; 44a; 44b; 44c), on the side of the casing (13; 13a; 13b; 13c), is provided for defining, on the side of the casing (13; 13a; 13b; 13c), the motion of the at least one frictional damping lining (36); and wherein a second stop element (45; 45a; 45b; 45c), on the side of the tappet (15), is provided for defining, on the side of the tappet (15), the motion of the at least one frictional damping lining (36).

8. A damper according to claim 1, wherein the contact-pressure piston (33; 33a; 33b; 33c) comprises several grooves (39; 39a; 39b; 39c) which are parallel to the central longitudinal axis (14) and taper in the direction towards the frictional damping lining (36).

* * * * *